United States Patent [19]

Ma et al.

[11] Patent Number: 5,677,818
[45] Date of Patent: Oct. 14, 1997

[54] DISK CARTRIDGE WITH FUZZED LINER

[75] Inventors: Yiping Ma, Layton; Theodore D. Hodapp, Manti; Mark S. Thayne, West Point; Ronald F. Hales, Roy, all of Utah

[73] Assignee: Iomega Corporation, Roy, Utah

[21] Appl. No.: 681,095

[22] Filed: Jul. 22, 1996

Related U.S. Application Data

[63] Continuation of Ser. No. 324,579, Oct. 18, 1994, abandoned.

[51] Int. Cl.[6] ................................................. G11B 23/03
[52] U.S. Cl. ........................... 360/133; 369/291; 206/313
[58] Field of Search ............................. 369/291; 360/133; 206/312, 313, 308.1, 308.3; 15/256.5

[56] References Cited

U.S. PATENT DOCUMENTS

| | | | |
|---|---|---|---|
| 4,392,170 | 7/1983 | Okada | 360/133 |
| 4,586,606 | 5/1986 | Howey | 206/313 |
| 4,610,352 | 9/1986 | Howey et al. | 206/313 |
| 4,648,002 | 3/1987 | Mroz et al. | 360/137 |
| 4,695,912 | 9/1987 | Moriwaki | 360/133 |
| 4,699,268 | 10/1987 | Oishi | 206/313 |
| 4,750,075 | 6/1988 | Oishi | 360/133 |
| 4,791,516 | 12/1988 | Seto | 360/133 |
| 4,812,938 | 3/1989 | Rogers et al. | 360/133 |
| 4,864,451 | 9/1989 | Iwasa et al. | 360/133 |
| 4,977,475 | 12/1990 | Shiba et al. | 360/133 |
| 5,006,948 | 4/1991 | Fukunaga et al. | 360/133 |
| 5,060,105 | 10/1991 | Howey | 360/133 |
| 5,083,231 | 1/1992 | Veenstra et al. | 360/133 |
| 5,115,961 | 5/1992 | Nakajima | 228/111 |
| 5,122,919 | 6/1992 | Takemae et al. | 360/133 |
| 5,179,487 | 1/1993 | Niitsuma et al. | 360/133 |
| 5,189,585 | 2/1993 | Kubo | 360/133 |
| 5,216,566 | 6/1993 | Obara et al. | 360/133 |
| 5,282,106 | 1/1994 | Saito et al. | 360/133 |
| 5,311,389 | 5/1994 | Howey | 360/133 |
| 5,455,109 | 10/1995 | Atkinson et al. | 428/284 |

FOREIGN PATENT DOCUMENTS

| | | |
|---|---|---|
| 62-22774 | 2/1987 | Japan . |
| 62-29678 | 2/1987 | Japan . |

OTHER PUBLICATIONS

Godwin, Jim "An Introduction to the Insite 325 Floptical®Disk Drive" SPIE vol. 1078 Optical Data Storage Topical Meeting 71-79 (1989).

*Primary Examiner*—Craig A. Renner
*Assistant Examiner*—William J. Klimowicz
*Attorney, Agent, or Firm*—Woodcock Washburn Kurtz Mackiewicz & Norris LLP

[57] ABSTRACT

A disk cartridge comprises a rotatable disk having upper and lower surfaces and an outer casing for rotatably housing the disk. The casing comprises upper and lower shells that mate to form the casing. Each of the upper and lower shells has an inner surface disposed in facing relation to a respective surface of the disk. The cartridge has a head access opening on its front peripheral edge, and the upper and lower shells have grooves formed therein to provide sufficient space for the magnetic heads of a disk drive to move across the surface of the disk. A non-woven fabric liner comprising a plurality of bonded fibers is attached to the inner surface of one of the upper and lower shells. A main body of the fabric liner lies against the inner surface of the shell and is spaced a predetermined distance from the corresponding surface of the disk. A region of the fabric liner is subjected to a fuzzing process in which the bonded fibers in that region are loosened to form a region of upstanding fibers that extend from the main body of the liner to the surface of the disk. The upstanding fibers wipe the surface of the disk while the main body of the liner remains spaced from the disk thereby reducing drag.

12 Claims, 5 Drawing Sheets

DISK CARTRIDGE WITH FUZZED LINER

This is a continuation of application Ser. No. 08/324,579, filed Oct. 18, 1994, now abandoned.

BACKGROUND

1. Field of the Invention

The present invention relates to disk cartridges for storing electronic information, and more particularly, to a disk cartridge having a fuzzed fabric liner and to a method of making the same.

2. Description of the Prior Art

Removable disk cartridges for storing digital electronic information typically comprise an outer casing or shell that houses a magnetic, magneto-optical or optical disk upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge at a given speed. The outer shell of the cartridge typically has an aperture near one edge to provide the recording heads of the drive with access to the disk. A shutter or door mechanism is often provided to cover the aperture when the cartridge is not in use to prevent dust or other contaminants from entering the cartridge and settling on the recording surface of the disk.

Although the cartridge shell and shutter mechanism provide some protection against contaminants entering the cartridge, some contaminants will inevitably reach the recording surface of the disk. For example, dust, smoke and other debris may enter the cartridge through the disk hub or through the cartridge shutter when the disk is inserted in a disk drive. Additionally, magnetic particles may be generated during manufacturing of the disk cartridge as well as during read/write operations in the disk drive. These contaminants can interfere with a read/write head causing errors and a potential loss of information.

To reduce the risk of read/write errors resulting from particles on the disk surface, cartridges often include one or more fabric liners within the cartridge placed in contact with the disk surface. These liners typically are formed of a mixture of non-woven fibers bonded together either thermally, with an adhesive binder, or through a hydroentangling process such as that described in U.S. Pat. No. 5,311,389. A fabric liner from Veratec Data Resources Group, called the "DataProtech Liner", is formed of a mixture of rayon (80%) and nylon (20%) fibers.

As illustrated in U.S. Pat. Nos. 4,750,075, 5,006,948, 5,083,231 and 5,216,566, the fabric liners are typically affixed to the upper and lower halves of the cartridge shell between so that they lie in a plane above the respective surfaces of the disk. In each of these examples, lifters and opposing ribs are provided on the inner surfaces of the upper and lower shells to bring the fabric liners into contact with at least a portion of the disk surface. Essentially, the lifters and ribs cooperate to force the liners against the disk surface. While the use of lifters and/or ribs ensures that the fabric liner contacts the disk surface and wipes unwanted particles from the disk, the force with which the liners are pressed against the disk creates a significant amount of drag on the disk as it rotates within the cartridge. Increased drag requires a corresponding increase in the strength of the disk drive spindle motor. Additionally, the increased contact pressure between the liners and the disk increases wear on the disk surface.

Accordingly, there is a need for a removable disk cartridge having a liner that provides adequate wiping of the disk to remove unwanted particles, but that creates much less drag on the disk and does not require lifters and/or ribs in the cartridge shell. The liner should also be low cost and easy to manufacture. The present invention satisfies these needs.

SUMMARY OF THE INVENTION

The present invention is directed to a disk cartridge having a fuzzed liner and a method of making the same. The disk cartridge comprises a rotatable disk having upper and lower surfaces and an outer casing for rotatably housing the disk. The casing comprises upper and lower shells that mate to form the casing. Each of the upper and lower shells has an inner surface disposed in facing relation to a respective surface of the disk. The cartridge has a head access opening on its front peripheral edge, and the upper and lower shells have grooves formed therein to provide sufficient space for the magnetic heads of a disk drive to move across the surface of the disk. A non-woven fabric liner comprising a plurality of bonded fibers is attached to the inner surface of one of the upper and lower shells. A main body of the fabric liner lies against the inner surface of the shell and is spaced a predetermined distance from the corresponding surface of the disk. A region of the fabric liner is subjected to a fuzzing process in which the bonded fibers in that region are loosened to form a region of upstanding fibers that extend from the main body of the liner to the surface of the disk. The upstanding fibers wipe the surface of the disk while the main body of the liner remains spaced from the disk thereby reducing drag. In a preferred embodiment, a second non-woven fabric liner is attached to the inner surface of the other of shells.

Preferably, the spacing between the main body of the fabric liner and the recording surface of the disk is in the range of 0.2 to 0.8 mm, and the fabric liner comprises a mixture of rayon and nylon fibers. The fabric liner preferably is attached to the inner surface of the shell by an adhesive. Additionally, the inner surfaces of the upper and lower shells preferably are substantially planar.

A method of assembling a disk cartridge in accordance with the present invention comprises the steps of: (a) providing an upper shell and a lower shell adapted to mate to form an outer casing of the disk cartridge; (b) affixing a non-woven fabric liner to an inner surface of one of the upper and lower shells, wherein the non-woven fabric liner comprises a plurality of fibers bonded together and defining a main body of the liner; and (c) fuzzing a region of the fabric liner by loosening the fibers in that region to create a region of upstanding fibers on the main body of the liner; and (d) rotatably mounting a disk between the upper and lower shells and joining said upper and lower shells to form said outer casing, wherein the main body of the liner is disposed in facing relation to a surface of the disk and is spaced a predetermined distance from the surface of the disk. The upstanding fibers in the fuzzed region of the liner, however, extend from the main body of the liner to the surface of the disk so as to contact the surface of the disk as the disk rotates within the casing. The fuzzed region wipes the disk of unwanted contaminant while providing very little drag on the disk as it rotates within the cartridge.

Preferably, the step of fuzzing a region of the liner comprises (a) placing the fabric liner in contact with the bristles of a brush; and (b) moving the bristles over the surface of the fabric liner in the designated region for a predetermined period of time. The bristles of the brush act to loosen the fibers in that region to create a region of upstanding fibers that extend outward from the main body of the fabric liner.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
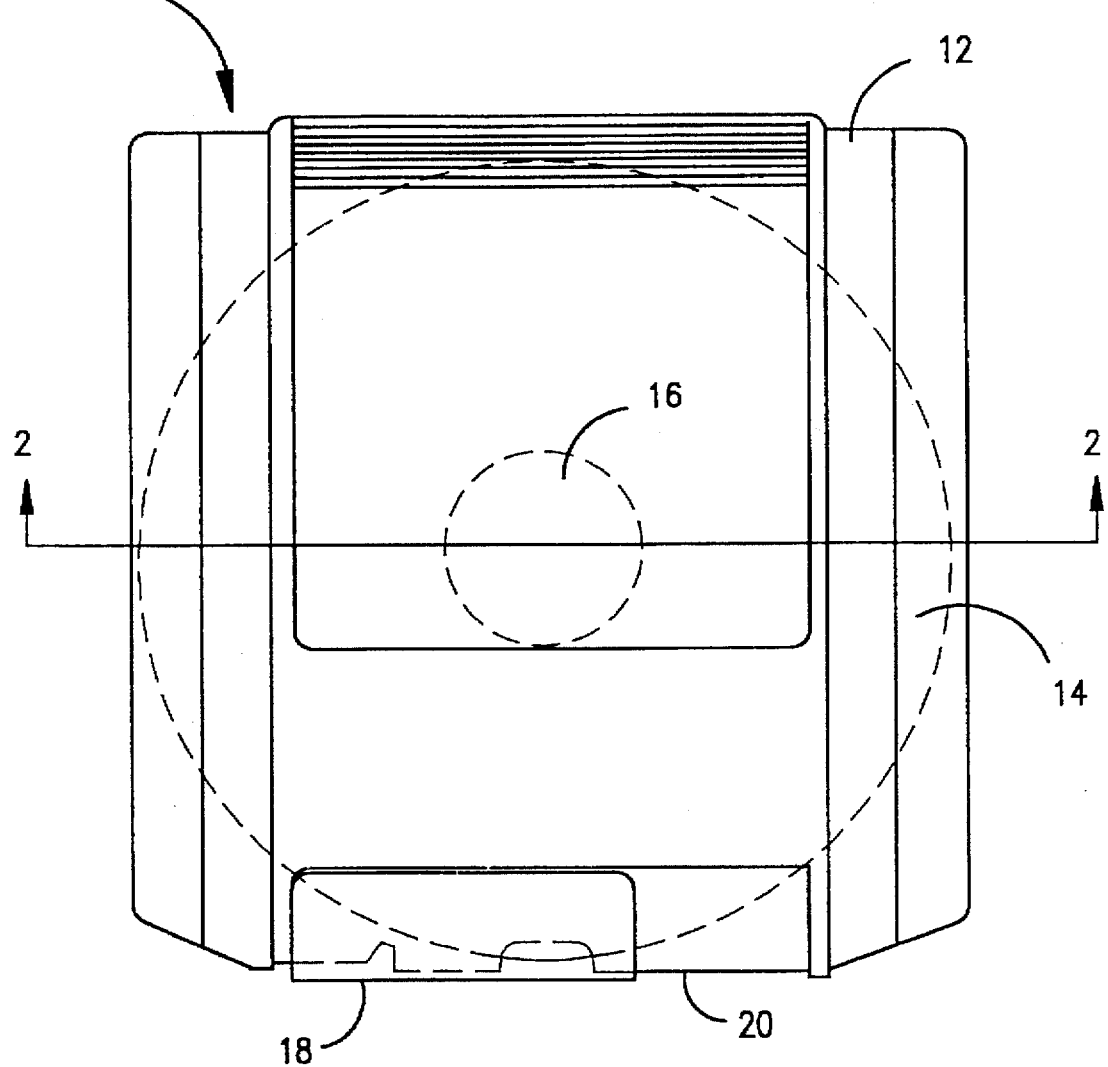
FIG. 1 is top view of a disk cartridge according a preferred embodiment of the present invention.

Referring to the drawings wherein like numerals indicate like elements throughout, there is shown in FIG. 1 a disk cartridge 10 comprising an outer casing 12 and a disk 14 having a hub 16 rotatably mounted in the casing 12. The casing 12 comprises upper and lower shells (FIGS. 3 & 4) that mate to form the casing. A shutter 18 is provided on the cartridge to cover an aperture (not shown) in the front edge 20 of the casing. When the cartridge is inserted into a disk drive (not shown), the shutter moves to the side exposing the aperture and thereby providing the read/write heads of the drive with access to the recording surface of the disk 14. In the present embodiment, the disk 14 comprises a flexible or floppy magnetic disk, however, in other embodiments, the disk may comprise a rigid magnetic disk, a magneto-optical disk or an optical storage medium. In the present embodiment, the magnetic disk 14 is formed of a thin (e.g. 0.0025 inches), flexible, circular base of polymeric film. Each side of the flexible disk is coated with a layer of magnetic recording material to form upper and lower recording surfaces.

Figure 2:
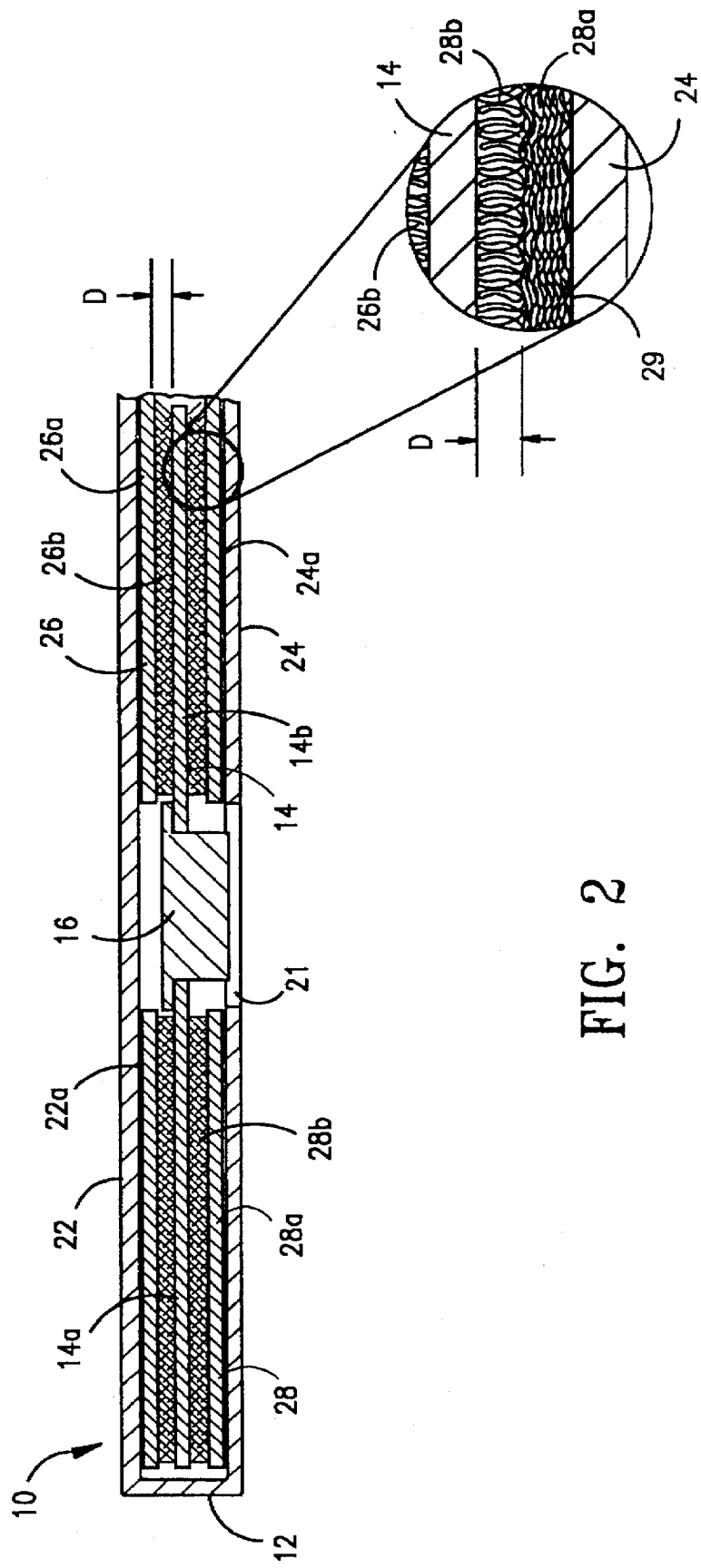
FIG. 2 is a sectional view of the cartridge of FIG. 1 taken along line 2—2 of FIG. 1.

Referring to FIG. 2, in greater detail, the upper shell 22 of the outer casing 12 has an inner surface 22a disposed in facing relation to the upper side 14a of the rotatable disk 14. Similarly, the lower shell 24 has an inner surface 24a disposed in facing relation to the lower surface 14b of the disk 14. As further shown, a circular cutout 21 is formed in the lower shell 24 to provide access to the disk hub 16. Preferably, the inner surfaces 22a, 24a of the upper and lower shells 22, 24 are substantially planar.

A first non-woven fabric liner 26 is attached to the inner surface 22a of the upper shell 22. Preferably, the liner 26 is formed of a mixture of non-woven fibers bonded together in any well known manner, such as thermally, with an adhesive binder, or through a hydroentangling process. As used herein and in the claims, the term "bonded" is intended to cover all such possibilities. In the present embodiment, the liner 26 is formed of a mixture of rayon (80%) and nylon (20%) fibers. One fabric liner suitable for use in accordance with the present invention, called the "DataProtech Liner", is available from Veratec Data Resources Group, 100 Elm Street, Walpole, Mass. 02081-1898. The "DataProtech Liner" has a standard weight of 30.0 GSY, a nominal thickness of 7.8 mils, and a standard dry "MD" tensile strength of 5.0 lb/in.

According to the present invention, when the fabric liner 26 is affixed to the inner surface 22a of the upper shell 22, the main body 26a of the liner is spaced from the disk, in facing relation thereto, a predetermined distance, D. The main body 26a of the liner does not contact the upper surface 14a of the disk 14. Preferably, the predetermined distance, D, is in the range of 0.2 to 0.8 mm. In the present embodiment, the predetermined distance, D, is approximately 0.5 mm.

Further in accordance with the present invention, a region of the fabric liner is subjected to a fuzzing process (described hereinafter) in which some of the bonded fibers in that region are loosened to form a region of upstanding fibers 26b that extend from the main body 26a of the liner to the surface 14a of the disk 14, as shown in FIG. 2. The upstanding fibers 26b contact the surface 14a of the disk and wipe any undesirable contaminants from the disk surface 14a as the disk 14 rotates in the casing 12. The main body 26a of the liner 26, however, remains spaced from the surface of the disk. With only the upstanding fibers 26b contacting the surface of the disk, drag on the disk is extremely low. Additionally, the upstanding fibers 26 wipe the disk without the need for conventional lifters and/or ribs to press the liner against the disk surface. Accordingly, the cartridge 10 of the present invention requires less components and is easier to manufacture. As can be appreciated, the upstanding fibers resulting from the fuzzing process must extend from the main body of the liner at least a distance equal to the predetermined spacing, D.

As further shown in FIG. 2, a second fabric liner 28, which may be identical to the first liner 26, is attached to the inner surface 24a of the lower shell 24. Like the first liner 26, the second liner 28 has a region of upstanding fibers 28b which extend from the main body 28a of the liner 28 to the lower surface 14b of the disk 14. The upstanding fibers 28b of the second liner 28 function identically to those of the first liner. The enlarged cross-sectional view of a portion of the second liner 28 provides further detail illustrating the bonded fibers of the main body 28a of the liner, as well as the upstanding fibers 28b resulting from the fuzzing of the liner in accordance with the present invention. It has been found that use of the opposing fuzzed liners in accordance with the preferred embodiment of the present invention has a tendency to stabilize the disk 14 during high speed rotation (e.g., 3600 rpm). Stabilization of the rotating media is desirable. Additionally, because the upstanding fibers are not densely packed together, they can also serve to filter the air within the cartridge.

In the present embodiment, the first and second liners 26, 28 are attached to the respective planar surfaces 22a, 24a of the upper and lower shells 22, 24 using an adhesive 29. Specifically, in the preferred embodiment, an adhesive that cures under exposure to ultra-violet light is printed on the inner surfaces 22a, 24a of the upper and lower shells 22, 24 using conventional pad printing technologies with a flat transfer pad. The liners 26, 28 are then placed on the respective shell surfaces 22a, 24a. A flat circular plate capable of transmitting ultra-violet light is then placed over each liner to press each liner against its respective shell surface. An ultra-violet light source is then used to expose the adhesive to ultra-violet light through the UV transmittable plate thereby curing the adhesive and affixing the liner to the shell surface. While this method of attachment is preferred, it is understood that other suitable methods may be employed.

Figure 3:
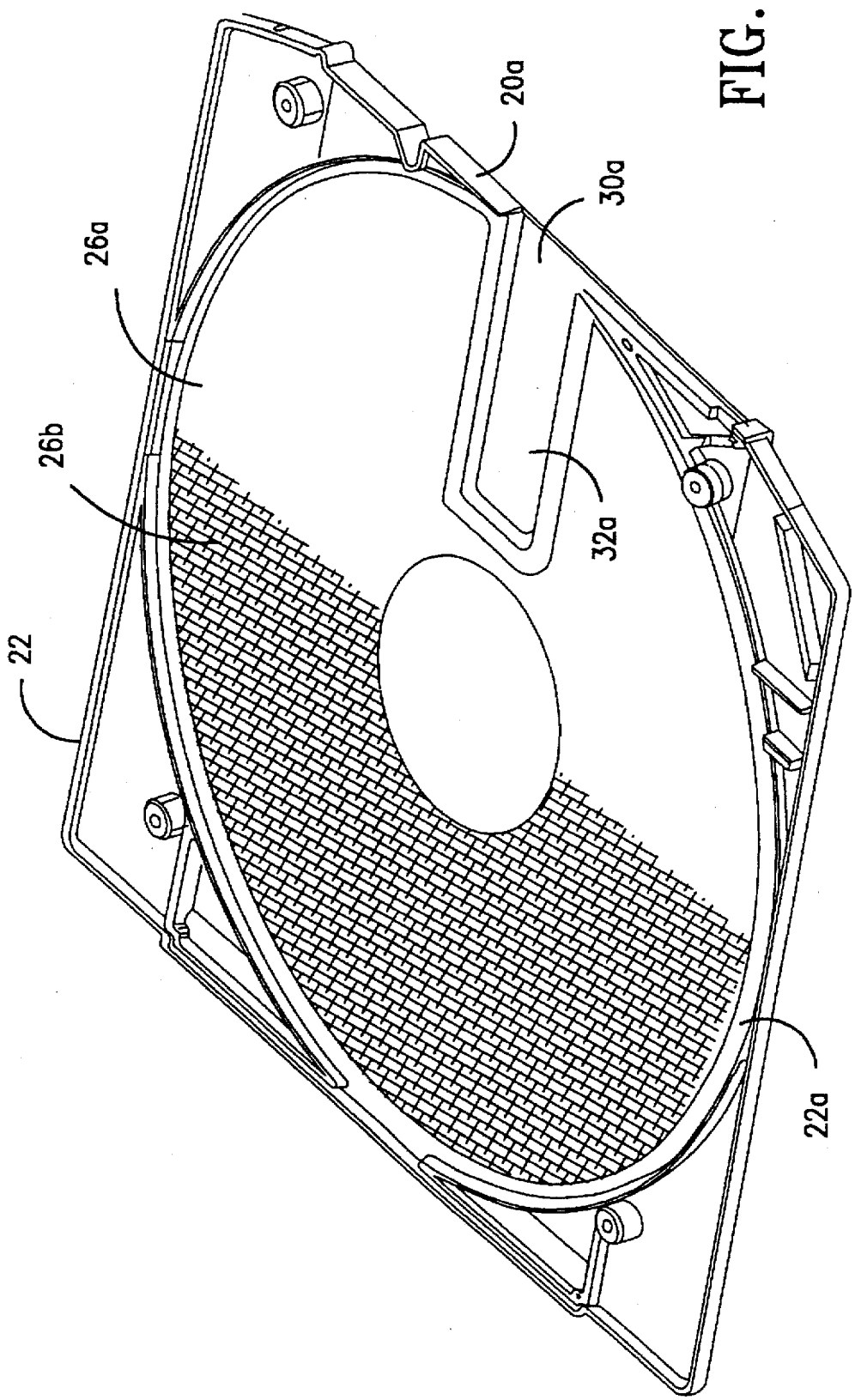
FIG. 3 is a perspective view of a fabric liner affixed to the inner surface of the lower shell of the cartridge of FIG. 1 and illustrates a fuzzed region of the liner in accordance with the present invention.
Figure 4:
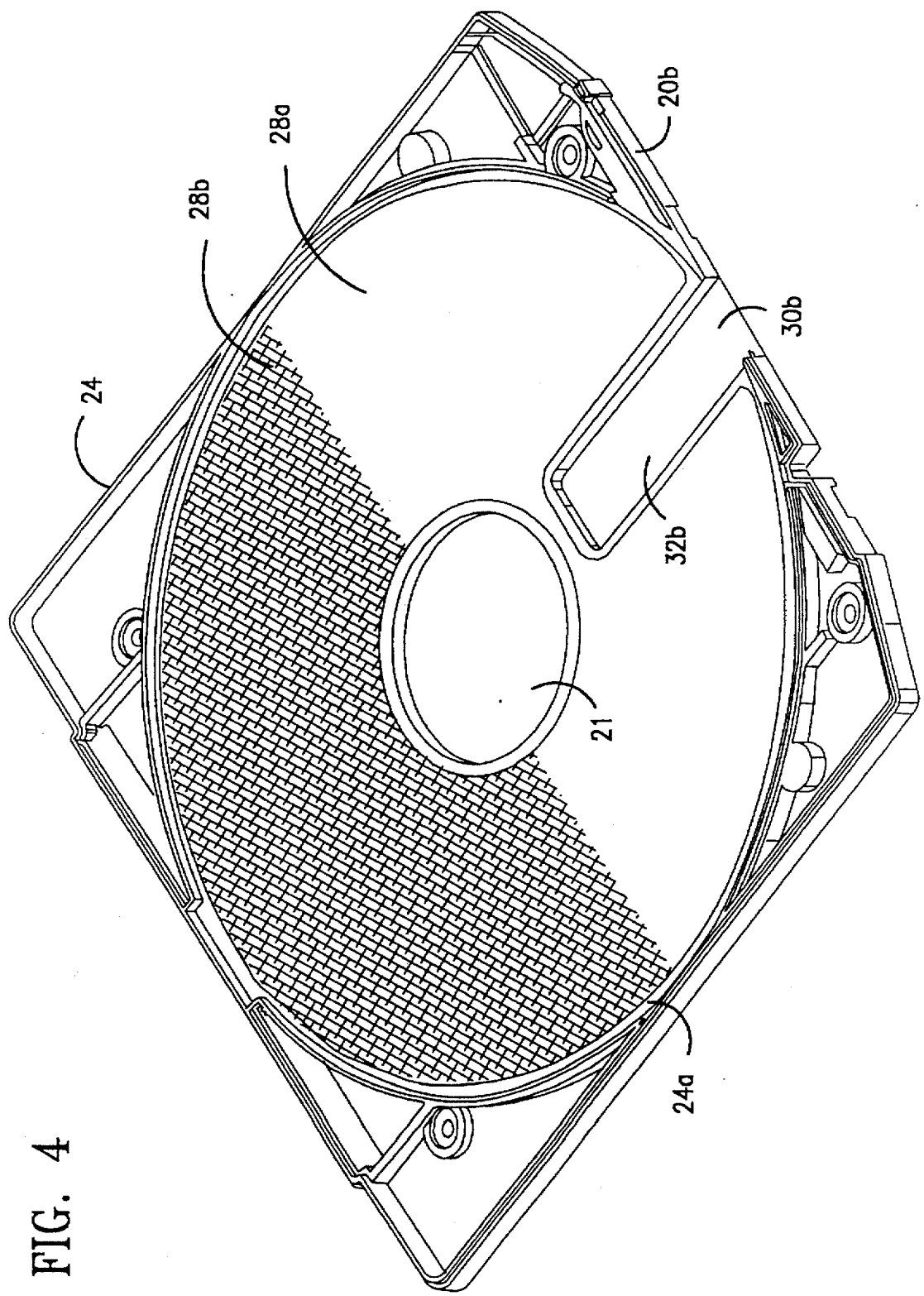
FIG. 4 is a perspective view of a fabric liner affixed to the inner surface of the upper shell of the cartridge of FIG. 1 and illustrates a fuzzed region of the liner in accordance with the present invention.

FIGS. 3 and 4 show further details of the inner surfaces 22a, 24a of the upper and lower shells 22, 24, respectively. As shown in FIG. 3, the inner surface 22a of the upper shell 22 is substantially planar, and the main body 26a of the first fabric liner 26 is affixed to the inner surface 22a of the upper shell 22 so that it lies substantially flat against the planar surface 22a. An opening 30a is provided in the front edge 20a of the upper shell 22, and a groove 32a is formed in the upper shell 22 that extends from the opening 30 toward the center of the shell 22.

As shown in FIG. 4, the inner surface 24a of the lower shell 24 is also substantially planar, and the main body 28a of the second fabric liner 28 is affixed to the inner surface 24a of the lower shell 24 so that it too lies substantially flat against the planar surface 24a. As further shown, the lower shell 24 includes an opening 30b and a groove 32b similar to that formed in the upper shell 22. A circular opening 21 in the lower shell 24 provides access to the hub 16 of the disk 14.

The opening 30a and groove 32a in the upper shell 22a cooperate with the opening 30b and groove 32b in the lower shell to provide the magnetic heads (not shown) of a disk drive with access to the recording surface(s) of the disk 14. As FIGS. 3 and 4 illustrate, according to an important feature of the cartridge 10 of the present invention, there is no aperture or opening in either the upper or lower shell surfaces. Rather, the grooves 32a, 32b form a closed channel within the cartridge. The only aperture through which the magnetic heads of a disk drive can enter the cartridge is that formed on the front edge 20 of the cartridge 10 by the respective openings 30a and 30b. By providing an aperture only in the front edge 20 of the cartridge, the risk of contaminants entering the cartridge and reaching the recording surface of the disk 14 is reduced.

FIGS. 3 and 4 further illustrate the sizes and shapes of the fuzzed regions 26b, 28b (shaded portions) of the first and second liners 26, 28, respectively, in accordance with the preferred embodiment. As shown, in the preferred embodiment, the fuzzed regions 26b, 28b of each liner 26, 28 occupy approximately fifty percent (50%) of the liner surface area. Moreover, in the present embodiment, the fuzzed region occupies a continuous semi-circular area of the liner, however, it is understood that the fuzzed regions are not limited to the sizes or shapes illustrated in FIG. 4. For example, the fuzzed region of a liner can occupy one or more non-continuous areas of the disk in, for example, a spoked pattern. Additionally, the regions may occupy more or less than fifty percent (50%) of the liner surface area. A portion of each liner is cut-away to accommodate the respective grooves 32a, 32b.

Figure 5:
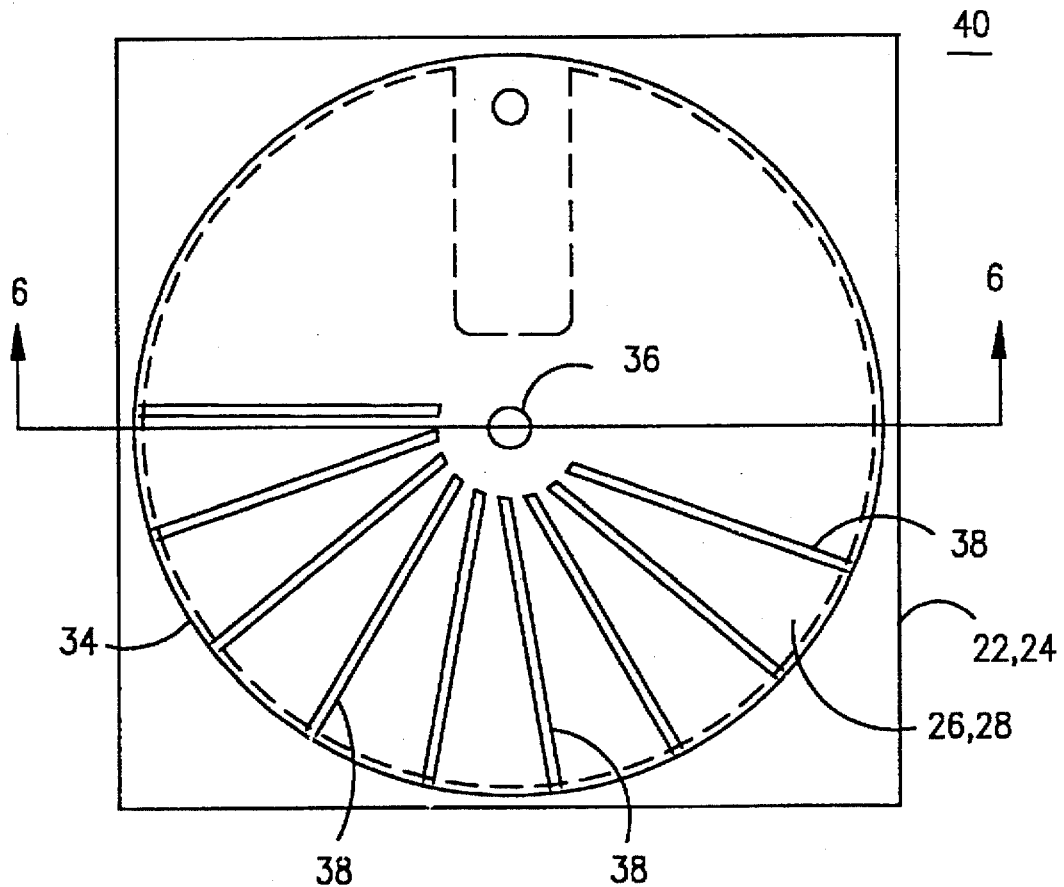
FIG. 5 is a top view of an apparatus for producing a fuzzed region of a fabric liner in accordance with the present invention.
Figure 6:
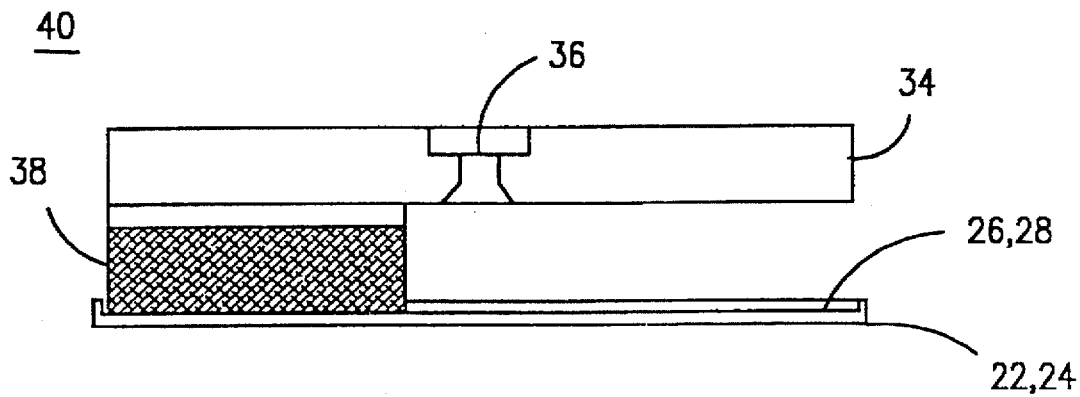
FIG. 6 is a sectional view of the apparatus of FIG. 5 taken along line 6—6 of FIG. 5.

FIGS. 5 and 6 show an apparatus for fuzzing a region of a non-woven fabric liner to produce a region of upstanding fibers extending outward from the main body or surface of the liner. The apparatus of FIGS. 5 and 6 can be used, for example, to create the fuzzed regions on the liners 26, 28 illustrated in FIGS. 2–4. As shown in FIGS. 5 and 6, the apparatus comprises a circular holding plate 34 that is rotatably mounted about a central axis 36. A plurality of flat brushes 38 are attached to the underside of the holding plate 34. Each brush is mounted such that its length extends along a radius of the holding plate 34. The bristles of each brush extend downwardly and perpendicularly to the plane of the holding plate 34. Although any suitable brush may be employed to implement each of the brushes 38 of the holding plate 34, in the present embodiment, each brush 38 comprises a "straight brush seal", part no. SFA104BL, available from Sealeze Corporation, 8013 Whitebark Terrace, Richmond, Va. 23237.

A non-woven fabric liner (e.g., liner 26, 28) to be subjected to the fuzzing process of the present invention is placed under the bristles of the respective brushes 38 such that the liner lies in a plane substantially parallel to the plane defined by the ends of the bristles. Preferably, the liner is attached to the surface of a cartridge shell (e.g., shell 22, 24) prior to operation of the apparatus 40. This ensures that the liner remains stationary during the fuzzing process.

Once the liner is situated properly, the holding plate is rotated back and forth through a predetermined arc. As the holding plate 34 rotates, the ends of the bristles scrape across the surface of the liner in the region. The action of the bristles on the surface of the liner causes the normally bonded fibers of the main body of the liner to loosen or break-away from the main body such that they extend upward from the main body of the liner (see enlarged view in FIG. 2). Thus, a region of upstanding fibers (i.e., a fuzzed region) is created on the liner. The size and shape of the fuzzed region of the liner is determined by the relative placement of the brushes 38 on the holding plate 34 and the length of the arc through which the holding plate 34 rotates during the fuzzing process. Many different sizes and shapes can be produced. It is desirable to lightly vacuum the liner in the fuzzed region to remove any fibers that may have been completely detached from the main body of the liner.

While the apparatus of FIGS. 5 and 6 illustrates a preferred method for producing a fuzzed region (i.e, a region of upstanding fibers) on a non-woven fabric disk liner, it is understood that the present invention is by no means limited thereto. Rather, the region of upstanding fibers on the fabric liners of a disk cartridge can be created using any suitable technique without deviating from the spirit and scope of the present invention. For example, rather than the technique illustrated in FIGS. 5 and 6, a fuzzed region can be created on a fabric liner by subjecting that region to a vacuum strong enough to pull certain fibers away from the main body of the liner into a substantially upstanding position.

As the foregoing illustrates, the present invention is directed to a disk cartridge having a fuzzed fabric liner and to a method of making the same. It is understood that changes may be made to the embodiments described above without departing from the broad inventive concepts thereof. For example, the fuzzed liners of the present invention may be employed in a disk cartridge having multiple recording media disposed in a stacked arrangement. Accordingly, the present invention is not limited to the particular embodiments disclosed, but is intended to cover all modifications that are within the spirit and scope of the invention as defined by the appended claims.

What is claimed is:

1. A disk cartridge comprising:

a rotatable disk having upper and lower surfaces;

an outer casing for rotatably housing said disk, said casing comprising upper and lower shells that mate to form said casing, each of said upper and lower shells having an inner surface disposed in facing relation to a respective surface of said disk; and a non-woven fabric liner comprising a plurality of bonded fibers, said fabric liner being attached to the inner surface of one of said upper and lower shells, a main body of said fabric liner lying against the inner surface of said one shell and being spaced a predetermined distance from the respective surface of said disk, the bonds between a plurality of the fibers in a region of the liner being loosened by a fuzzing process to create a region of loosened unbonded upstanding fibers, wherein each of said loosened unbonded upstanding fibers is individually unbonded from each other fiber and each loosened unbonded upstanding fiber extends from the main body of said liner to the surface of said disk, whereby said loosened unbonded upstanding fibers wipe the surface of said disk while the main body of the liner remains spaced from said disk thereby reducing drag on said disk.

2. A disk cartridge as recited in claim 1 further comprising:

a second non-woven fabric liner comprising a plurality of bonded fibers, said second fabric liner being attached to the inner surface of the other of said upper and lower shells, a main body of said second fabric liner lying against the inner surface of said other shell and being spaced a predetermined distance from the respective surface of said disk, said second fabric liner having a fuzzed region of upstanding fibers that extend from the main body of said second fabric liner to the surface of said disk.

3. A disk cartridge as recited in claim 1 wherein said predetermined distance is in the range of 0.2 to 0.8 mm.

4. A disk cartridge as recited in claim 1 wherein said fabric liner comprises a mixture of rayon and nylon fibers.

5. A disk cartridge as recited in claim 1 wherein said fabric liner is attached to the inner surface of said one shell by an adhesive.

6. A disk cartridge as recited in claim 1 wherein the inner surfaces of said upper and lower shells are substantially planar.

7. A disk cartridge comprising:

a rotatable disk having upper and lower surfaces;

an outer casing for rotatably housing said disk, said casing comprising upper and lower shells that mate to form said casing, each of said upper and lower shells having an inner surface disposed in facing relation to a respective surface of said disk; and a non-woven fabric liner comprising a plurality of bonded fibers, said fabric liner being attached to the inner surface of one of said upper and lower shells, a main body of said fabric liner lying against the inner surface of said one shell and being spaced a predetermined distance from the respective surface of said disk, at least a region of said fabric liner having been subjected to a fuzzing process in which the bonds between fibers in that region are loosened to form a fuzzed region of loosened unbonded upstanding fibers, wherein each of said loosened unbonded upstanding fibers is individually unbonded from each other fiber and each loosened unbonded upstanding fiber extends from the main body of said liner to the surface of said disk, whereby the loosened unbonded upstanding fibers wipe the surface of said disk while the main body of the liner remains spaced from said disk thereby reducing drag on said disk.

8. A disk cartridge as recited in claim 7 further comprising:

a second non-woven fabric liner comprising a plurality of bonded fibers, said second fabric liner being attached to the inner surface of the other of said upper and lower shells, a main body of said second fabric liner lying against the inner surface of said other shell and being spaced a predetermined distance from the respective surface of said disk, at least a region of said second fabric liner having been subjected to a fuzzing process in which the bonded fibers in that region are loosened to form a region of upstanding fibers that extend from the main body of said second fabric liner to the surface of said disk.

9. A disk cartridge as recited in claim 7 wherein said predetermined distance is in the range of 0.2 to 0.8 mm.

10. A disk cartridge as recited in claim 7 wherein said fabric liner comprises a mixture of rayon and nylon fibers.

11. A disk cartridge as recited in claim 7 wherein said fabric liner is attached to the inner surface of said one shell by an adhesive.

12. A disk cartridge as recited in claim 7 wherein the inner surfaces of said upper and lower shells are substantially planar.

* * * * *